United States Patent [19]

Beall

[11] 4,449,083
[45] May 15, 1984

[54] STAGGER FEED CONTROL CIRCUIT

[75] Inventor: Charles D. Beall, Tallahassee, Fla.

[73] Assignee: Wayne H. Coloney Co., Inc., Tallahassee, Fla.

[21] Appl. No.: 390,615

[22] Filed: Jun. 21, 1982

[51] Int. Cl.³ ............................................. G05B 19/28
[52] U.S. Cl. .................................. 318/602; 364/475; 364/571; 72/22
[58] Field of Search ............... 318/600, 601, 602, 571, 318/440–443; 226/150; 100/43; 364/475; 72/22

[56] References Cited

U.S. PATENT DOCUMENTS

| | | | |
|---|---|---|---|
| 3,329,327 | 7/1967 | Scribner | 226/150 |
| 4,062,213 | 12/1977 | Schneider et al. | 364/475 X |
| 4,104,723 | 8/1978 | Tokuno et al. | 318/600 X |
| 4,114,079 | 9/1978 | Miyakita | 318/601 |
| 4,170,155 | 10/1979 | Saito et al. | 364/475 X |
| 4,305,029 | 12/1981 | Takahashi | 318/602 X |

Primary Examiner—B. Dobeck
Attorney, Agent, or Firm—Dowell & Dowell

[57] ABSTRACT

Control circuitry for a work strip stamping machine to control the longitudinal advance and the transverse strip shifting so that a selected number of rows can be automatically stamped, the control being synchronized with the cycle of the stamping member by a sensor that generates an initiating pulse to start the next advance and/or shift of the strip. The circuit includes CMOS flipflops and shift registers that provide a repeating sequence of pulses which are delivered through buffers to the solenoids that actually initiate the advance and shift of the work strip. The circuit is operated from the AC mains, but includes a battery back-up circuit that automatically takes over in the event of a power failure and inhibits further cycling of the system while at the same time maintaining voltage on the CMOS components of the circuit to retain a memory of its status until the AC power is restored.

9 Claims, 5 Drawing Figures

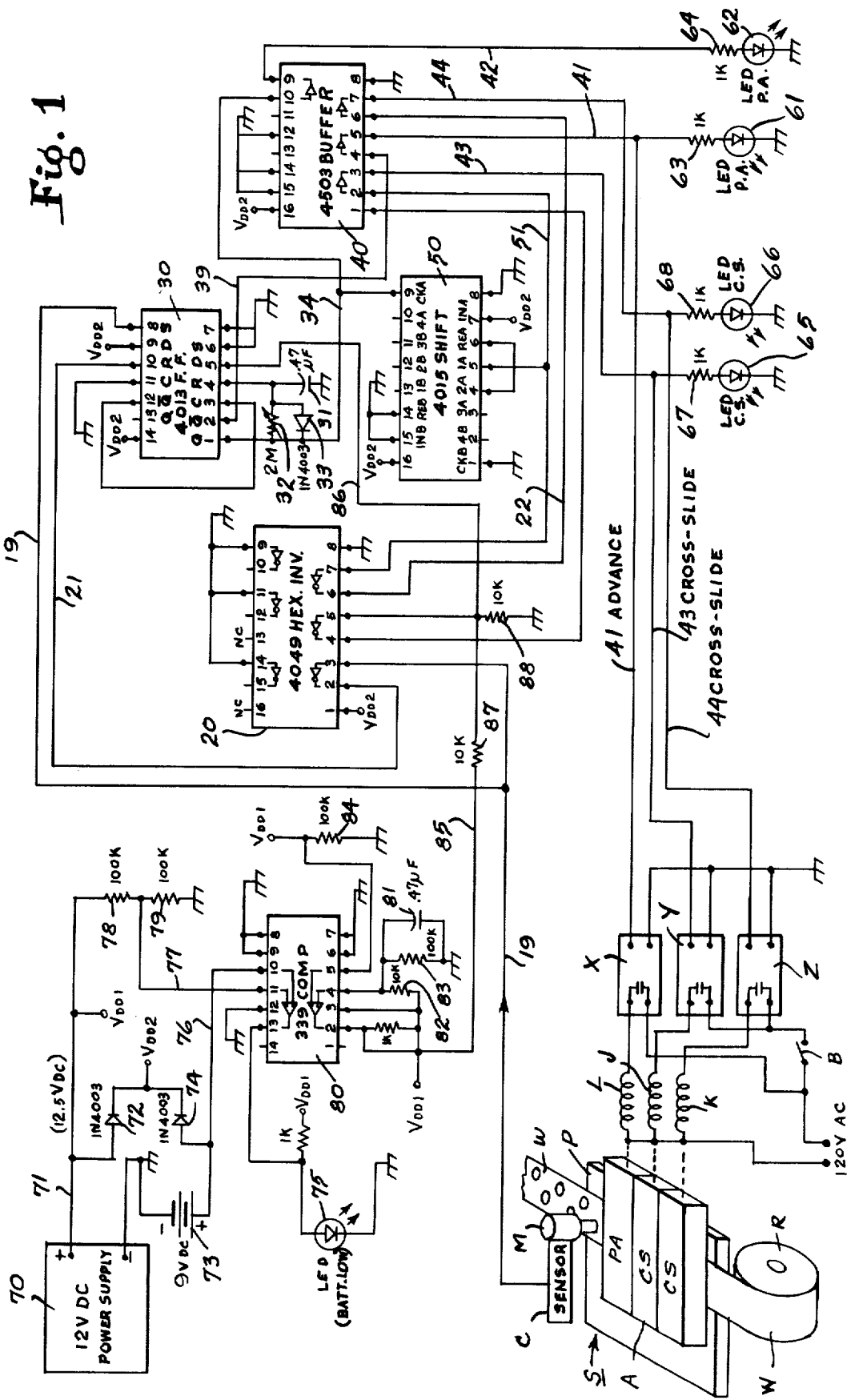

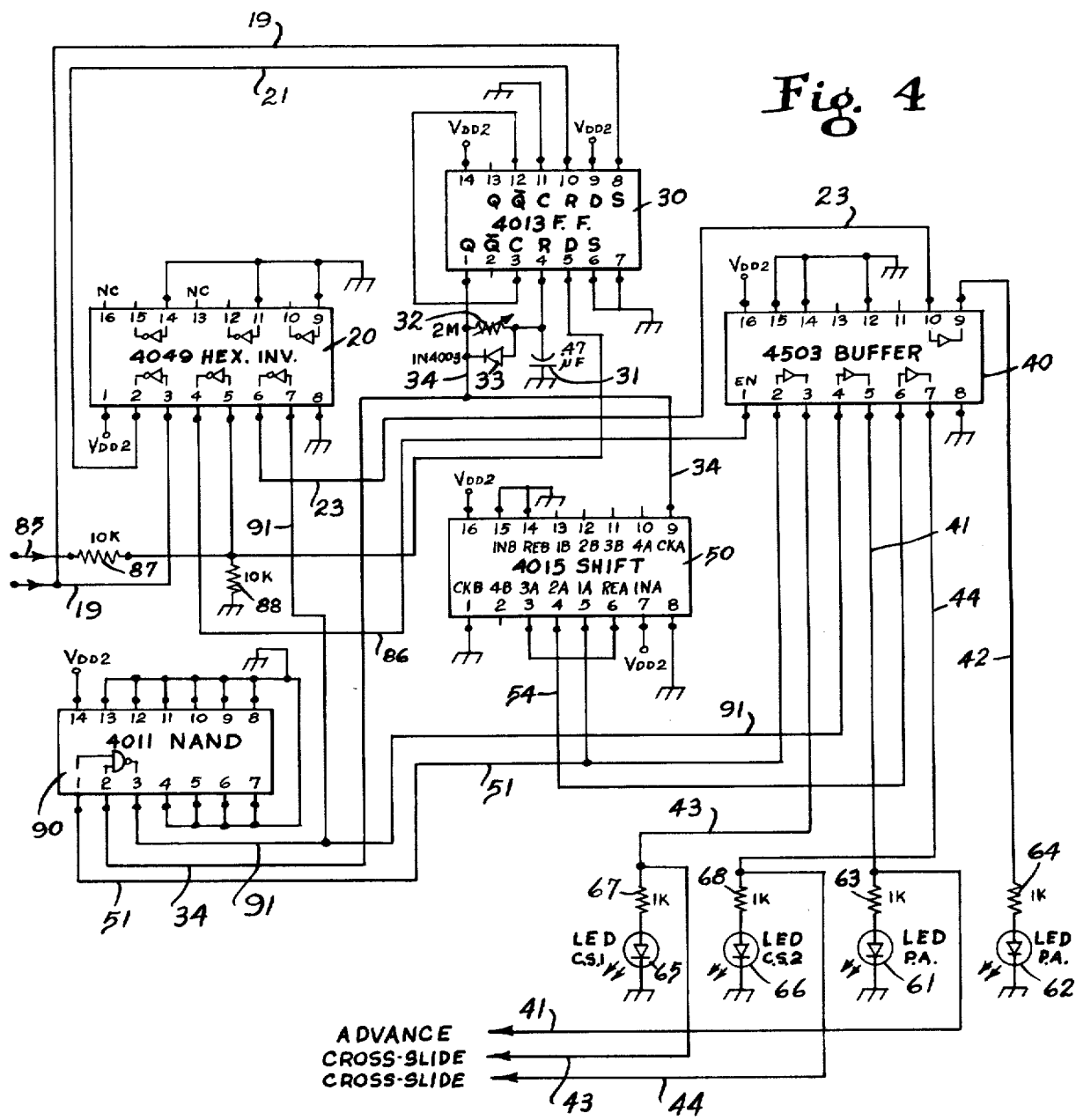

STAGGER FEED CONTROL CIRCUIT

BACKGROUND AND PRIOR ART

This application relates to electronic circuitry to control the feeding of sheet stock in the form of thin metal strips from a roll or reel to a stamping machine, such as a punch or transfer press. In each stamping cycle of the machine, during the time when the reciprocating member is clear of the stock, the feed actuators advance the stock through appropriate incremental steps suitable for moving the stock longitudinally and for shifting it laterally normal to the direction of advance. This results in multiple staggered rows of stampings, and of course provides a considerably more efficient use of the strip material resulting in reduction of waste.

In the past, this type of stagger feed control has been done mechanically, but mechanical control is quite expensive and requires substantial maintenance. Pneumatic logic circuitry has also been used, but suffers from slowness of operation, variations in air pressure, and air purity problems caused by dirt, oil, water. Moreover, pneumatic logic circuitry is relatively complex, and the complexity increases greatly when the number of staggered rows is increased.

The use of electronic circuitry is far superior for the reasons that will be discussed hereinafter under the objects and advantages of the present invention, and of course it is in common use in machine control systems as shown in various patents such as Schneider et al, U.S. Pat. No. 4,062,213.

THE INVENTION

This invention employs CMOS electronic circuitry to provide logic to control the functioning of mechanical work strip incrementing and shifting actuators that are carried by the stamping machine and operate in synchronism with the cycle of the machine as determined by a sensor that is responsive to the position of the stamping member. In response to each synchronizing signal from the sensor, a sequential pulse generator in the electronic control circuit delivers pulses appropriate to control the necessary feed of the strip longitudinally and transversely so that the next cycle of the stamping member will be properly incremented and/or staggered to another row. Buffers receive these pulses and deliver drive signals to the pull advance actuator that increments the strip longitudinally and to the cross slide actuator means that shift the strip transversely to achieve the desired staggering. The CMOS circuitry is provided with a main power supply and with an auxiliary battery circuit which is automatically enabled to retain the memory of the last feed position during a power down situation, at which time the feed is automatically inhibited until the main power supply is again operative. Circuitry for stamping strips in one, two or three rows is shown in drawings, although the stamping of more rows is within the intention of the present disclosure.

OBJECTS AND ADVANTAGES OF THE INVENTION

It is a principal object of the invention to provide electronic control circuitry which accomplishes control of the functions heretofore done pneumatically or mechanically, but does them faster and cheaper and more flexibly. The circuitry can be quickly altered or switched to change the number of rows presented to the machine for stamping, It is cheap and easy to service and provides greater reliability with quick substitution of a backup circuit board in case of trouble to minimize down-time. Moreover, the complexity required of pneumatic circuitry to perform in a flexible manner is already built into the electronic chips of the present circuitry and requires only simple changing of jumpers or throwing of switches to modify the operation of the feed.

It is a major advantage of the electronic circuitry that the use of CMOS chips permits a small battery to retain the last position of the feed in the chip "memory" by maintaining voltage on the chips, which draw virtually no current when they are not changing state. As a result, after power down, the feed will start up again with the proper advance both longitudinally and transversely so as to position the strip correctly for the next stamping cycle of the machine.

Another object of the invention is to provide circuitry in which the durations of the drive signals to the strip advancing actuators is controlled by R/C components in the circuitry which are easily selected and adjusted to match different mechanical actuators, or stroke length adjustments.

Other objects and advantages will become apparent during the following discussion of the drawings.

THE DRAWINGS

FIG. 1 is a schematic diagram showing a preferred embodiment for the electronic control circuitry of the present invention, shown coupled to a stamping machine supporting a detector and strip advancing actuator means;

FIG. 2 is a plan view of a metal work strip stamped in a two row staggered pattern;

FIG. 3 is a plan view of a metal work strip stamped in a single row pattern with the staggering actuators rendered inoperative;

FIG. 4 is a partial schematic diagram similar to a portion of FIG. 1 but showing changes in wiring to produce a three row pattern; and FIG. 5 is a plan view of a metal work strip stamped in a three row staggered pattern.

DESCRIPTION OF DRAWINGS

Referring now to the drawings, FIG. 1 shows a stamping machine S having a cyclically operating stamping member M located above a platen P over which a metal work strip W passes from a roll R of stock. The strip passes through an assembly of actuators A which include a pull advance actuator PA for advancing the strip through successive longitudinal increments, and multiple cross-slide actuators CS which shift the strip transversely to staggered positions depending upon which of the cross-slide actuators CS has most recently been enabled. In the particular system being currently manufactured, the actuators are pneumatic and are enabled by solenoids schematically represented by the windings L, J and K, these solenoids being controlled respectively by optically isolated solid state relays X, Y and Z. The stamping machine and the actuators, however, form no part of the present invention which relates to the electronic control system.

The machine is further equipped with a sensor C which detects the cycle of the stamping member M and delivers a synchronizing signal to the electronic control circuit each time the stamping member M cycles, thereby to permit the electronic control circuitry to time the strip stock feed to the stamping machine.

The synchronizing signal is a positive pulse delivered along the wire 19 to the set terminal 8 of a first flipflop section of a dual flipflop 30, and as this pulse goes positive the first flipflop section is set, delivering a high output on the terminal 12 which is connected to the clock terminal 3 of the second flipflop section to cause it to toggle and deliver a high output on wire 34 to the time delay R/C circuit comprising the capacitor 31 and the adjustable resistor 32. As the capacitor 31 charges, the voltage on the reset terminal 4 rises and after the appropriate delay resets the second flipflop section so that the Q terminal 1 again goes low discharging the capacitor 31 through the diode 33. The first flipflop section is reset by the trailing edge of the synchronizing pulse on wire 19 which is connected also to an inverter chip 20 at terminal 3 to deliver a high (inverted low on wire 19) at terminal 2. The inverted output on terminal 2 is connected via wire 21 to the reset terminal 10 of the first flipflop section. For the duration of R/C time delay the second flipflop continues to output a high signal from Q terminal 1 via wire 34 to the buffer chip 40 terminal 10, and a low signal on wire 39 from terminal 2 to the buffer chip 40 terminal 4. This buffer chip delivers corresponding amplified drive signals respectively from terminal 5 to the output wire 41 which drives the pull-advance actuator PA through the solenoid L and the solid state relay X to longitudinally advance the strip by one increment, as will be more fully described hereinafter.

The R/C time constant of the capacitor 31 and resistor 32 determines the output drive duration to the pull-advance actuator on wire 41 to allow it to complete its pull cycle. The diode 33 hastens the discharge of the capacitor when the terminal 1 on chip 30 goes low again. When the second flipflop section is reset at the end of the R/C time duration, then terminal 1 goes low and terminal 2 goes high, likewise reversing the binary levels of the wires at the amplifier terminals 9 and 5 of the chip 40.

As stated above, the output from the terminal 1 of the flipflop chip 30 on wire 34 goes high with each synchronizing pulse from the stamping member sensor C and remains high for the duration of the R/C time constant. The wire 34 is also connected to the clock terminal 9 of one section of the dual shift register chip 50, the other section not being used. Therefore, with each occurrence of a synchronizing pulse on wire 19, the shift register is shifted one step. However, it can shift through only two steps, because the second step output terminal 4 is connected to the reset terminal 6, assuming only two rows on the strip W are to stamped as shown if FIG. 2. The output terminal 5 for the first stage of the shift register 50 is connected through wire 51 and the buffer chip 40 terminals 2 and 3 to wire 43 which drives one of the cross slide actuators CS through solenoid J and the solid state relay Y. Wire 51 is also connected through the inverter chip 20 terminals 7 and 6, and through the wire 22 and the buffer chip terminals 6 and 7 to wire 44 which drives the other cross slide actuator CS through solenoid K and the solid state relay Z.

The longitudinal pull actuator wires 41 and 42 are provided with LED indicators 61 and 62 respectively, which are coupled thereto by current limiting resistors 63 and 64. Likewise, the transverse shift actuator wires 43 and 44 are provided with LED indicators 65 and 66 respectively, which are coupled thereto by current limiting resistors 67 and 68. These LED indicators show the binary state of each of these actuator wires and are useful for servicing and for indicating the state of the actuators if the system is stopped, for instance during power down.

FIG. 2 shows the pattern punched in a work strip W under the control of the circuit shown in FIG. 1. In this pattern, the strip is pulled by the actuator in response to each synchronizing pulse on wire 19, and is alternately shifted transversely to a new position in the other row.

If a single row pattern as shown in FIG. 3 is desired, this can be accomplished by merely opening the switch B, FIG. 1, to disable both cross-slide detented solenoids J and K so that the strip remains continuously aligned in one selected row. However, it is also necessary to increase the increment through which the strip is advanced after each stamping cycle, by increasing the mechanical stroke length adjustment for the actuator PA. For this purpose the R/C time constant must be increased by increasing the resistance, which is controlled by the adjustable potentiometer 33.

FIGS. 4 and 5, discussed hereinafter, describe the system where more than two rows are being stamped.

The circuit is normally powered from the AC mains through a DC power supply 70 of conventional design. Its output on wire 71 passes through a coupling diode 72 and normally powers the circuit at points $V_{DD2}$. However, in the the event of a power down situation, the battery 73 can maintain through the coupling diode 74 enough voltage on the chips to retain a "memory" of their state so that startup will resume on the correct portion of the cycle. This alternate function involves the comparator chip 80 which has two comparators. The upper comparator serves to indicate a low battery condition to warn that the battery should be charged or replaced. It compares a reference voltage on wire 77 taken from the power supply 70 and divided by the resistors 78 and 79, with the voltage of the battery appearing on wire 76, and delivers an output to light the warning LED 75 when the battery voltage falls below the reference voltage on wire 77. The lower comparator on chip 80 serves to inhibit any further cycling of the circuit when the power fails in the main supply 70. It establishes on terminal 4 of chip 80 a reference potential by charging capacitor 81 through resistor 82, the resistor 83 being of such resistance as will drain the capacitor 81 at a slower rate than the rate at which it is charged. A higher potential appears normally on terminal 5 than on terminal 4 when the power supply 70 is operating properly, the potential being taken from the supply across the resistor 84, so that the output terminal 2 of the comparator is normally high. If the power fails, the level of terminal 5 suddenly drops below the level at the terminal 4, which decreases more slowly, so that terminal 2 goes low. The capacitor 81 soon drains, whereby the wire 85 goes low placing a low "inhibit" level on the wire 86 through the divider comprising resistors 87 and 88. This low on wire 86 places a low on the data terminal 5 of the second flipflop in the chip 30, preventing it from toggling, and thereby stopping further advance of the metal work strip W by the actuators A, until the power supply 70 is up to voltage again.

The pull advance actuator PA and the cross-slide actuators CS that are used in the working embodiment of the machine to which the present control circuit is connected are pneumatically powered and controlled by valves (not shown) that are operated by solenoids represented in FIG. 1 by the windings L, K and J. A typical pneumatic system is shown in U.S. Pat. No. 3,329,327 to Scribner, and is a purchased item made by P/A Industries Inc., Bloomfield, Conn. and designated by Model No. C3-14195. Such a unit works in two steps, including a step that actually grips the strip W and pulls it, and a step that grasps the strip and holds it while the pull mechanism is returning to obtain a new grip ready for another pull to increment the strip again. The pulses on wire 41 have the correct polarity to operate these steps through internal logic which is a part of the purchased actuator. This logic includes air piping (not shown) between a spring returned valve (not shown) operated by the solenoid L and pilot valve means (not shown) in the actuator PA and connected to the normally closed solenoid valve port. This logic is operative to advance the strip stock W when a binary low appears on the wire 41. The advantage of the normally closed piping is that in case of power failure, when power is not available to hold the solenoid in for the entire R/C time constant duration, nevertheless, because the actuator PA is compressed air operated it will complete a cycle even though the air port signal is removed when the spring returned valve solenoid loses its holding voltage.

The cross slide solenoid air valves (not shown) are double detented valves, and if they do not complete their stroke during a power failure, the battery back-up will hold the CMOS logic in the current state, and the solenoids will complete their strokes at power up.

The PA actuator pulls the work strip W during the duration of the R/C time constant while wire 34 is high causing LED 62 to light, and wire 39 is low causing wire 41 to go low. Wire 34 also inputs to the clock terminal of the shift register chip 50 which operates to pulse the cross slide actuators CS alternately during successive high periods of the R/C time constant 31,32. The inverter at pins 6 and 7 of chip 20 is used to insure that the mechanically opposed cross slide solenoids never energise at the same time.

In the event that three or more rows are to be stamped, some alteration of the wiring of the chips 30, 40 and 50 is necessary. FIG. 5 shows a suitable circuit for this purpose. This schematic diagram corresponds with the right-hand side of FIG. 1, altered by adding a NAND gate chip 90 and by several wiring changes. The left hand side of the diagram to which wires 19, 85, 41, 43 and 44 connect would be the same as in FIG. 1.

The output of the sensor C on wire 19 operates the flipflops in chip 30 as described in connection with FIG. 1 so that the Q terminal 1 of chip 30 goes high for each positive pulse on wire 19, and remains high until the R/C time constant 32,31 discharges resetting the lower flipflop so that terminal 1 again goes low and the other terminal 2 goes high again, which condition prevails until the next pulse on wire 19 signifying another stamping cycle of the stamping member M, the capacitor 31 discharging through the diode 33. Moreover, as in FIG. 1, the high on wire 34 persists for the duration of the R/C time constant and clocks the shift register 50 through its clock terminal 9 to place a high on the next one of its output terminals 5, 4 or 3, until the high on the latter resets the register to all lows on these terminals.

By observing FIG. 5 it will be seen that the work strip W will have three rows stamped, and that the strip must be longitudinally advanced after two of the stamping cycles, but not after the third. The NAND gate 90 participates in achieving this sequence of steps. Beginning at the first stamping position F shown in FIG. 5, the toggling of the flipflop 30 in response to a pulse on wire 19 to place a high on wire 34 clocks the shift register 50 to place a high on terminal 5 and on wire 51 which drives the wire 43 through the drive buffer chip 40 and energises the solenoid J through the relay Y to cause the associated cross-slide actuator to shift the strip W to the right. The signal on wire 51 also makes terminal 1 of the NAND gate 90 go high. The other input from wire 34 to terminal 2 of the NAND gate 90, also being high, causes the output of the NAND gate 90 to go low at terminal 3 on wire 91. This low signal on wire 91 is inverted in the inverter 20 which outputs a high on wire 23 to terminal 10 of the buffer chip 40 which then outputs a high on wire 42 to light the diode 62. The low output from the NAND gate 90 on wire 91 also delivers a low on wire 41 to the relay X and pull-advance actuator solenoid L as needed to advance the strip W longitudinally, thereby reaching the second position for stamping in the intermediate row at position I. The next pulse on wire 19 again toggles the flipflop 30 and inserts another clock pulse in the shift register 50 causing it to develop a high also on terminal 4, wire 54, the terminal 5 and wire 51 remaining high. This high on wire 54 causes the buffer chip 40 to deliver a high drive signal on wire 44 to drive the solenoid K through the relay Z and cause the second cross-slide actuator CS to shift the strip W to its third row position T. Simultaneously, the highs on wires 51 and 34 again bring a low from the output terminal 3 of NAND gate 90, thereby causing the strip W to advance once again longitudinally to the third position T as shown in FIG. 5.

However, it will be noted in FIG. 5 that the next stamping position N does not require longitudinally advance, but only lateral shifting. This occurs when the pulse 19 next occurs and toggles the flipflop 30 to again output a high on terminal 1 to clock the shift register to the next condition in which the third stage terminal 3 goes high. This high immediately drives the reset terminal 6 to reset the shift register to all lows at its output terminals 5, 4 and 3. As a result, the input terminal 1 of the NAND gate 90 goes low while the input terminal 2 remains high, so that now there is a high output from the NAND gate at terminal 3. This causes a high output from the drive buffer 40, terminal 5, on wire 41, and the pull advance actuator fails to advance the strip longitudinally. The two lows now appearing on the cross-slide actuator wires 43 and 44 allow the strip W to move again to the leftmost row and assume position N. The above stepping sequence then commences again upon occurrence of the next pulse on wire 19 from the sensor C.

This invention is not be limited to the illustrative embodiments shown in the drawings, for obviously changes can be made within the scope of the following claims.

I claim:

1. A control system for feeding strip material to a cyclic stamping machine synchronously with the cycle thereof, the machine having longitudinal strip-incrementing actuator means and having transverse strip-shifting actuator means for shifting the strip laterally to permit stamping the strip in a repeating pattern having multiple different longitudinal rows, the control system comprising:

sensor means operative to sense each cycle of the machine and deliver a synchronizing signal in response thereto;

multiple buffer means operative in response to sequential pulses to deliver a drive signal to said incrementing actuator means to shift the strip longitudinally, and to deliver a drive signal to an associated one of said shifting actuator means to shift the strip transversely to another of said rows; and sequential pulse generating means having different outputs respectively connected to different buffer means and operative in response to said synchronizing signals to deliver a repeating sequence of pulses determining said pattern to different ones of said outputs and associated buffer means in a repeating sequence.

2. The control system as claimed in claim 1, wherein said sequential pulse generating means comprises flipflop means coupled to receive said synchronizing signal and be toggled thereby, and having outputs delivering opposite logic levels; and wherein said pulse generating means further comprises register means driven by output of the flipflop means, and having multiple outputs successively enabled when so driven, and having reset means connected to one register output to reset the sequence; and the buffer means being connected to be driven by the outputs of the pulse generating means.

3. The control system as claimed in claim 2, wherein the buffer means connected to deliver drive signals to the incrementing actuator means is connected to receive output from the flipflop means and be driven thereby, and the buffer means connected to deliver drive signals to the shifting actuator means is connected to receive output from the register means and be driven thereby.

4. The control system as claimed in claim 3, wherein two rows appear in the pattern, one shifting actuator means being connected to be driven by an output of the register means, and the other shifting actuator means being connected through an inverter to be driven by the same output of the register means.

5. The control system as claimed in claim 4, wherein switch means is provided at said shift actuator means to disable the latter to provide stamping in one row only.

6. The control system as claimed in claim 3, wherein the flipflop means includes a monostable flipflop having an R/C time constant controlling the duration of the time its output is set, and the buffer means connected to drive the incrementing actuator means being connected to receive drive from the output of the monostable flipflop.

7. The control system as claimed in claim 3, wherein more than two rows appear in the pattern, the shifting actuator means being connected to buffer means which are enabled by different outputs of the sequential pulse generating means.

8. The control system as claimed in claim 1, wherein the system has a power supply coupled to deliver power to the system from the AC mains, and has a battery power source also coupled to deliver power to the system, and the system having comparator means for comparing the voltage levels of the AC power supply and the battery source and operative when the battery level exceeds the AC source level to inhibit toggling of the flipflop means.

9. The control system as claimed in claim 8, wherein the system further includes means for comparing the voltage level of the battery with a reference voltage level taken from the AC supply, and operative to deliver a "low battery" signal if the voltage level of the battery falls below said reference level.

* * * * *